(12) United States Patent
Avramov et al.

(10) Patent No.: US 9,286,047 B1
(45) Date of Patent: Mar. 15, 2016

(54) DEPLOYMENT AND UPGRADE OF NETWORK DEVICES IN A NETWORK ENVIRONMENT

(71) Applicants: Lucien M. Avramov, Sunnyvale, CA (US); Sameer Kittur, Bangalore (IN); Chandrasekhar V. Modumudi, Bangalore (IN); Praful G. Bhaidasna, Santa Clara, CA (US)

(72) Inventors: Lucien M. Avramov, Sunnyvale, CA (US); Sameer Kittur, Bangalore (IN); Chandrasekhar V. Modumudi, Bangalore (IN); Praful G. Bhaidasna, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 427 days.

(21) Appl. No.: 13/766,458

(22) Filed: Feb. 13, 2013

(51) Int. Cl.
| | |
|---|---|
| *H04L 12/26* | (2006.01) |
| *H04L 12/24* | (2006.01) |
| *G06F 15/177* | (2006.01) |
| *G06F 12/02* | (2006.01) |
| *G06F 15/173* | (2006.01) |
| *G06F 15/16* | (2006.01) |
| *G06F 9/445* | (2006.01) |

(52) U.S. Cl.
CPC ....................................... *G06F 8/61* (2013.01)

(58) Field of Classification Search
CPC .......... H04L 12/26; H04L 12/24; H04L 29/06
USPC ........................................................ 709/221
See application file for complete search history.

(56) References Cited

U.S. PATENT DOCUMENTS

| | | | |
|---|---|---|---|
| 5,555,416 A | 9/1996 | Ownes et al. | |
| 6,999,452 B1 | 2/2006 | Drummond-Murray et al. | |
| 7,111,055 B2 | 9/2006 | Falkner | |
| 7,356,679 B1 * | 4/2008 | Le ..................... | G06F 17/30067 707/E17.01 |
| 7,360,072 B1 * | 4/2008 | Soltis .................... | G06F 9/4416 709/222 |
| 7,568,107 B1 * | 7/2009 | Rathi et al. ..................... | 713/182 |
| 7,743,242 B2 | 6/2010 | Oberhaus et al. | |
| 7,787,480 B1 | 8/2010 | Mehta et al. | |

(Continued)

FOREIGN PATENT DOCUMENTS

| | | |
|---|---|---|
| EM | 1076848 B1 | 7/2002 |
| EP | 2043320 A1 | 4/2009 |

OTHER PUBLICATIONS

USPTO Jan. 27, 2015 Final Office Action from U.S. Appl. No. 13/758,732.

(Continued)

*Primary Examiner* — Kevin Bates
*Assistant Examiner* — Mark A Scott
(74) *Attorney, Agent, or Firm* — Patent Capital Group

(57) ABSTRACT

A method for deployment and upgrade of network devices in a network environment includes receiving (for example, at a switch being activated in the network environment), Dynamic Host Configuration Protocol (DHCP) information (for example, from a DHCP server in the network environment). The DHCP information includes a filename and location of a script file. The method further includes downloading the script file from a script server in the network environment and executing the script file. Executing the script file includes copying a configuration file and one or more software images to a memory element of the switch, where the configuration file includes configuration settings relevant to at least a switch identity, and a switch location in the network environment, installing the software images on the switch, rebooting the switch, applying configuration settings from the configuration file to the software images, and saving the configuration file to the memory element.

20 Claims, 10 Drawing Sheets

(56) References Cited

U.S. PATENT DOCUMENTS

| | | | |
|---|---|---|---|
| 7,788,477 B1* | 8/2010 | Huang | G06F 9/4416 713/1 |
| 8,160,063 B2 | 4/2012 | Maltz et al. | |
| 8,179,809 B1* | 5/2012 | Eppstein et al. | 370/252 |
| 8,966,021 B1* | 2/2015 | Allen | G06F 15/16 709/220 |
| 2003/0126242 A1* | 7/2003 | Chang | 709/222 |
| 2003/0177208 A1* | 9/2003 | Harvey | G06F 8/665 709/221 |
| 2004/0255050 A1 | 12/2004 | Takehiro et al. | |
| 2005/0028154 A1 | 2/2005 | Smith et al. | |
| 2005/0083933 A1 | 4/2005 | Fine et al. | |
| 2005/0177829 A1* | 8/2005 | Vishwanath | 717/177 |
| 2005/0198629 A1* | 9/2005 | Vishwanath | 717/174 |
| 2006/0173912 A1* | 8/2006 | Lindvall | G06F 8/60 |
| 2006/0280179 A1 | 12/2006 | Meier | |
| 2007/0118654 A1* | 5/2007 | Jamkhedkar | G09F 8/60 709/226 |
| 2007/0162420 A1* | 7/2007 | Ou | G06F 17/30575 |
| 2007/0214348 A1* | 9/2007 | Danielsen | G06F 9/4416 713/2 |
| 2007/0230415 A1* | 10/2007 | Malik | H04L 41/0806 370/338 |
| 2007/0250930 A1* | 10/2007 | Aziz | G06F 21/554 726/24 |
| 2008/0046708 A1* | 2/2008 | Fitzgerald | G06F 8/63 713/2 |
| 2008/0120350 A1* | 5/2008 | Grabowski | G06F 16/30067 |
| 2008/0155245 A1* | 6/2008 | Lipscombe et al. | 713/2 |
| 2009/0059934 A1 | 3/2009 | Aggarwal et al. | |
| 2009/0300180 A1* | 12/2009 | Dehaan | H04L 41/0266 709/225 |
| 2010/0049839 A1* | 2/2010 | Parker | H04L 12/2602 709/221 |
| 2010/0138526 A1* | 6/2010 | DeHaan et al. | 709/223 |
| 2010/0180016 A1* | 7/2010 | Bugwadia | G06F 9/4411 709/220 |
| 2011/0107074 A1* | 5/2011 | Chan | G06F 9/4406 713/2 |
| 2011/0107331 A1* | 5/2011 | Evans | H04W 4/003 718/1 |
| 2011/0158088 A1* | 6/2011 | Lofstrand | G06F 9/465 370/229 |
| 2011/0246663 A1 | 10/2011 | Melsen et al. | |
| 2012/0219004 A1 | 8/2012 | Balus et al. | |
| 2012/0233348 A1* | 9/2012 | Winters | 709/232 |
| 2012/0281700 A1 | 11/2012 | Koganti et al. | |
| 2013/0003733 A1 | 1/2013 | Venkatesan et al. | |
| 2013/0007435 A1* | 1/2013 | Bayani | G06F 9/4401 713/2 |
| 2013/0124807 A1* | 5/2013 | Nielsen et al. | 711/162 |
| 2013/0125107 A1* | 5/2013 | Bandakka | G06F 8/665 717/171 |
| 2013/0148663 A1 | 6/2013 | Xiong | |
| 2013/0201986 A1 | 8/2013 | Sajassi et al. | |
| 2013/0205293 A1* | 8/2013 | Levijarvi | G06F 8/61 717/177 |
| 2013/0219161 A1* | 8/2013 | Fontignie et al. | 713/2 |
| 2013/0232498 A1* | 9/2013 | Mangtani et al. | 718/104 |
| 2013/0301472 A1 | 11/2013 | Allan | |
| 2013/0336164 A1 | 12/2013 | Yang et al. | |
| 2013/0346736 A1* | 12/2013 | Cook et al. | 713/2 |
| 2014/0105029 A1 | 4/2014 | Jain et al. | |
| 2014/0156816 A1* | 6/2014 | Lopez Da Silva | H04L 41/042 709/221 |
| 2014/0219079 A1 | 8/2014 | Kapadia et al. | |
| 2014/0286354 A1* | 9/2014 | Van De Poel | G06F 9/542 370/463 |

OTHER PUBLICATIONS

USPTO Jul. 7, 2014 Non-Final Office Action from U.S. Appl. No. 13/758,732.

U.S. Appl. No. 13/758,732, filed Feb. 4, 2013 entitled "Provisioning of a New Node Joining an Existing Cluster in a Data Center Environment," Inventors: Shyam Kapadia, et al.

Cisco Systems, Inc. "Cisco, Nexus 3000 Series NX-OS Release Notes, Release 5.0(3)U3(1)," Feb. 29, 2012, Part No. OL-26631-01, 16 pages; http://www.cisco.com/en/US/docs/switches/datacenter/nexus3000/sw/release/503_u3_1/n3k_rel_notes_503_u3_1.html.

Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages; http://www.cisco.com/en/US/docs/switches/datacenter/nexus3000/sw/fundamentals/503_U3_1/b_Nexus_3000_Fundamentals_Guide_Release_503_U3_1_chapter_0111.pdf.

Cisco Systems, Inc., "Cisco IOS Configuration Fundamentals Configuration Guide: *Using Autoinstall and Setup*," Release 12.2, © 2002-2006, 32 pages; http://www.cisco.com/en/US/docs/ios/12_2/configfun/configuration/guide/fcf002.html.

Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages http://www.cisco.com/en/US/docs/switches/datacenter/nexus5000/sw/release/notes/Rel_5_1_3_N2_1/Nexus5000_Release_Notes_5_1_3_N2.html.

USPTO May 8, 2015 Notice of Allowance from U.S. Appl. No. 13/758,732.

* cited by examiner

```
subnet 10.10.1.0 netmask 255.255.255.0 {
        option routers              10.10.1.32;
        option subnet-mask          255.255.255.0;
        option domain-name-servers  10.10.1.32;
        option tftp-server-name     10.10.1.50;
        option bootfile-name        "/poap_script.py";
        range                       10.10.1.101 10.10.1.199;
```

FIG. 4

```
#md5sum="d1fd3449f5285d90070bfd04d98e9bd1"

[root@imager-001 ~]# md5sum poap_script.py
d1fd3449f5285d90070bfd04d98e9bd1  poap_script.py
```

FIG. 5

```
# Host name and user credentials
username = "user"
password = "cisco\r"
hostname = "192.168.1.1"
vrf      = os.environ['POAP_VRF']
```

FIG. 6

```
# POAP can use 3 modes to obtain the configuration file.
# - 'poap_static' - file is statically specified
# - 'poap_location' - CDP neighbor of interface on which
DHCPDISCOVER arrived is used to derive the configuration file
# - 'poap_serial_number' - switch serial number is used to derive
the config file
poap_config_file_mode = "poap_serial_number"
```

FIG. 7

```
# Procedure to set config_file_src
def setSrcCfgFileNameLocation():
    global config_file_src, poap_script_log_handler, env
    startAppend = 0
    timeout = -1
    poap_write_to_file(poap_script_log_handler, "\nshow cdp neighbors interface %s" % os.environ['POAP_INTF'])
    cdpOutput = cli ("show cdp neighbors interface %s" % os.environ['POAP_INTF'])
    cdpOutArray = cdpOutput[1].split("\n")
    cdpRaw = cdpOutArray[ 7].split()
    cdpRawIntf = cdpOutArray[len(cdpOutArray) - 2].split()
    cdplist = cdpRaw[0].split('(')
    switchName = cdplist[0]
    intfName   = cdpRawIntf[len(cdpRawIntf) - 1]
    config_file_src = "conf_%s_%s.cfg" % (switchName, intfName)
    config_file_src = string.replace(config_file_src, "/", "_")
    poap_write_to_file(poap_script_log_handler, "\nSelected conf file name : %s" % config_file_src)
```

FIG. 8

```
System and Kickstart image info ######
# Source path of both System and Kickstart images
image_path = "/home/"
# Source file name of System Image
system_image_src = "switch-uk9.5.0.3.U3.2.bin"
# Destination file name of System Image
system_image_dst = "switch.s"
# indicates if System Image is copied
system_image_copied = 0
# Source file name of Kickstart Image
kickstart_image_src = "switch-uk9-kickstart.5.0.3.U3.2.bin"
# Destination file name of Kickstart Image
kickstart_image_dst = "switch.k"
# indicates if Kickstart Image is copied
kickstart_image_copied = 0
# Timeout info
config_timeout = 120
system_timeout = 2100
kickstart_timeout = 900
```

FIG. 9 verifyfreespace()

copy config file and images
copyConfig()

copy config file and images
copySystem()
copyKickstart()

signal.signal(signal.SIGTERM, sig_handler_no_exit)

install images
installImages()

if emptyFirstFile is 0:
    cli ('copy bootflash:%s scheduled-config' % config_file_dst_first)
    poap_write_to_file(poap_script_log_handler, "\n
### Copying the first scheduled cfg done ##########")
    removeFile("/bootflash/%s" % config_file_dst_first)

cli ('copy bootflash:%s scheduled-config' % config_file_dst_second)
poap_write_to_file(poap_script_log_handler, "\n######### Copying the second scheduled cfg done ##########")
removeFile("/bootflash/%s" % config_file_dst_second)

FIG. 10

```
# Procedure to copy config file using global information
def copyConfig ():
    global username, hostname, config_path, config_file_src, config_file_dst,
config_timeout, poap_script_log_handler, emptyFirstFile, password
    org_file = config_file_dst
    if os.path.exists("/bootflash/%s" % org_file):
        poap_write_to_file(poap_script_log_handler, "\nINFO: File already
exists")
        emptyFirstFile = 0
        return poap_write_to_file(poap_script_log_handler, "\nINFO: Starting Copy of
Config File")
    tmp_file = "%s.tmp" % org_file
    time = config_timeout
    src = "%s%s" % (config_path, config_file_src)
    doCopy ("ftp", hostname, src, org_file, vrf, time, username, password,
tmp_file)
    config_copied = 1
    if copyMd5Info(config_path, config_file_src):
        md5sumGiven = getMD5SumGiven("md5sum", "%s.md5" % config_file_src)
        if md5sumGiven:
            if not verifyMD5sumofFile(md5sumGiven, "%s%s" % (destination_path,
org_file)):
                poap_write_to_file(poap_script_log_handler, "\n#### config
file MD5 verification failed #####\n")
                poap_script_log_handler.close()
                exit(1)
```

```
# Procedure to split config file using global information
def splitConfigFile ():
    global config_file_dst, config_file_dst_first, config_file_dst_second,
emptyFirstFile, poap_script_log_handler
    configFile       = open("/bootflash/%s" % config_file_dst, "r")
    configFile_first = open("/bootflash/%s" % config_file_dst_first, "w+")
    configFile_second = open("/bootflash/%s" % config_file_dst_second, "w+")
    line = configFile.readline()
    while line != "":
        if not string.find(line, "hardware profile portmode", 0, 25) or not
string.find(line, "hardware profile tcam", 0, 21):
            configFile_first.write(line)
            if emptyFirstFile is 1:
                emptyFirstFile = 0
            else:
            configFile_second.write(line)
            line = configFile.readline()

configFile.close()
    removeFile("/bootflash/%s" % config_file_dst)
    configFile_first.close()
    if emptyFirstFile is 1:
```

FIG. 12

Applying scheduled configuration...
Copy complete, now saving to disk (please wait)...
[################################################] 100%
Copy complete, now saving to disk (please wait)...
Done
User Access Verification
switch-poap login:

FIG. 13

DEPLOYMENT AND UPGRADE OF NETWORK DEVICES IN A NETWORK ENVIRONMENT

TECHNICAL FIELD

This disclosure relates in general to the field of communications and, more particularly, to deployment and upgrade of network devices in a network environment.

BACKGROUND

Data centers are increasingly used by enterprises for collaboration and for storing data and/or resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance. In such data centers and similar networking environments, automation, including in deployment and upgrade of network devices, can enable operational efficiencies.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified diagram illustrating other example details of the system in accordance with one embodiment;

FIG. 5 is a simplified diagram illustrating yet other example details of the system in accordance with one embodiment;

FIG. 6 is a simplified diagram illustrating yet other example details of the system in accordance with one embodiment;

FIG. 7 is a simplified diagram illustrating yet other example details of the system in accordance with one embodiment;

FIG. 8 is a simplified diagram illustrating yet other example details of the system in accordance with one embodiment;

FIG. 9 is a simplified diagram illustrating yet other example details of the system in accordance with one embodiment;

FIG. 10 is a simplified diagram illustrating yet other example details of the system in accordance with one embodiment;

FIG. 11 is a simplified diagram illustrating yet other example details of the system in accordance with one embodiment;

FIG. 12 is a simplified diagram illustrating yet other example details of the system in accordance with one embodiment;

FIG. 13 is a simplified diagram illustrating yet other example details of the system in accordance with one embodiment;

DETAILED DESCRIPTION OF EXAMPLE EMBODIMENTS

Overview

An example method for deployment and upgrade of network devices in a network environment includes receiving Dynamic Host Configuration Protocol (DHCP) information (e.g., at a switch being activated in the network environment from a DHCP server in the network environment). The DHCP information includes a filename and location of a script file. The method further includes downloading the script file (e.g., from a script server in the network environment) and executing the script file. Executing the script file includes copying a configuration file and one or more software images to a memory element of the switch, where the configuration file includes configuration settings relevant to at least a switch identity, and a switch location in the network environment, installing the software images on the switch, rebooting the switch, applying configuration settings from the configuration file to the software images, and saving the configuration file (e.g., to a random access memory in the memory element).

Example Embodiments

Figure 1:
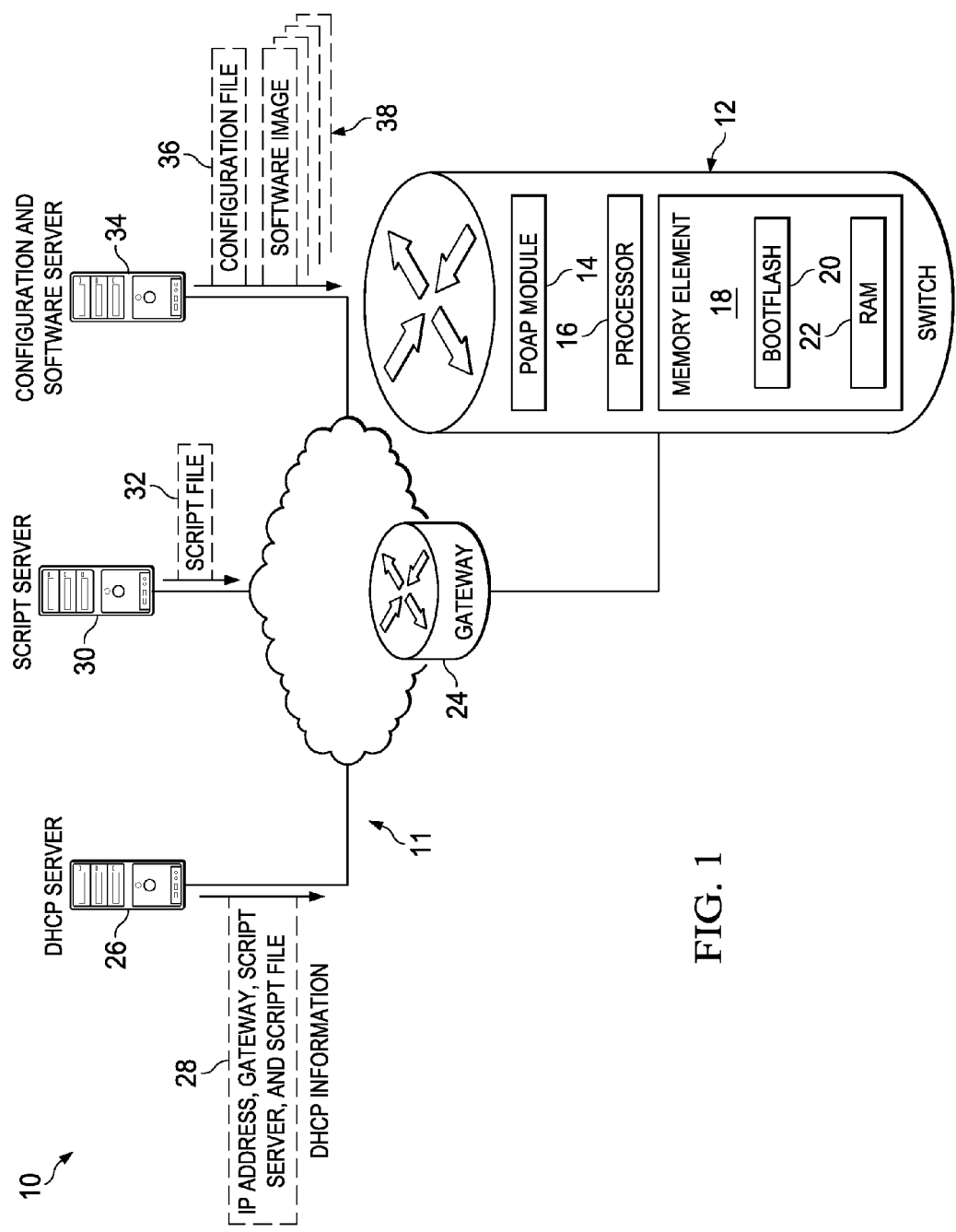
FIG. 1 is a simplified block diagram illustrating a system for deployment and upgrade of network devices in a network environment.

Turning to FIG. 1, FIG. 1 is a simplified block diagram illustrating a communication system 10 for deployment and upgrade of network devices in a network environment. FIG. 1 includes a network 11 (generally indicated by an arrow) comprising a switch 12. As used herein, the term "switch" includes a network element configured to receive, route, and forward packets from various other network elements within a network environment, such as network 11. The term "network element" is meant to encompass computers, network appliances, servers, routers, switches, gateways, bridges, load balancers, firewalls, processors, modules, or any other suitable device, component, element, or object operable to exchange information in the network environment. Moreover, the network elements may include any suitable hardware, software, components, modules, interfaces, or objects that facilitate the operations thereof. This may be inclusive of appropriate algorithms and communication protocols that allow for the effective exchange of data or information.

Switch 12 includes a Power-On-Auto-Provisioning (POAP) module 14, a processor 16, and a memory element 18 (among other components). Memory element 18 may include a bootflash 20 and a Random Access Memory (RAM) 22.

Switch 12 may communicate via a gateway (e.g., router, another switch, etc.) 24 with a Dynamic Host Configuration Protocol (DHCP) server 26, from which switch 12 may obtain DHCP information 28, comprising, for example, Internet Protocol (IP) address, gateway identity, script server name, and script file details. Switch 12 may also communicate with a script server 30, from which switch 12 may obtain a script file 32. As used herein, the term "script file" includes a set of instructions, written in a scripting language, such as Python, Tool Command Language (TCL), etc., such that the set of instructions can be executed by processor 16 without compiling. The script file is not in binary format (e.g., compiled code, or executable code) and is capable of being interpreted (by the network element on which it is executing) from the source code. Switch 12 may further communicate with a configuration and software server 34, from which switch 12 may obtain a configuration file 36 and one or more software images 38.

As used herein, the term "configuration file" includes one or more files comprising initial settings for one or more computer programs. Configuration file 26 can be used to set switch processes and switch operating systems. The contents of configuration file 36 may vary with location (e.g., address, position, relative situation in the network topology, such as leaf, spine, etc.) and identity of switch 12, among other factors. In various embodiments, configuration file 36 may be written in ASCII (or UTF-8) and line-oriented, with lines terminated by a newline or carriage return/line feed pair, depending on the operating system. In other embodiments, configuration file 36 may be formatted as a simple database. Configuration file 36 may be generated by a user using appropriate tools (e.g., graphical user interfaces, text editor, etc.) and stored in configuration and software server 34. In some embodiments, configuration file 36 may be read once at startup. In other embodiments, configuration file 36 may be stored locally (e.g., in RAM 22) and read periodically, for example, when relevant software programs are initiated. In yet other embodiments, switch 12 may periodically download configuration file 36 to check for changes (e.g., script file 32 may be configured to instruct POAP module 14 to re-read configuration file 36 and apply the changes to currently executing processes).

As used herein, the term "software image" includes one or more files comprising contents and structure representing computer programs stored on a data storage medium (e.g., of configuration and software server 34). When the software image is installed (e.g., data for executing the computer programs written to a hard drive or other suitable memory element and the computer programs prepared for execution) on a network device, such as switch 12, the computer programs represented by the one or more files may become operational, and can execute instructions thereof. Software image 38 can include files representing kickstart (e.g., a composite file containing multiple different sections used to activate the software system of switch 12) and system binary files (e.g., contains software daemons and processes that execute the software system) used by the switch operating system for startup and booting (e.g., loading and running initial processes to create filesystems and to activate switch 12 for its regular operations).

According to various embodiments, communication system 10 may provide an intelligent deployment method, affording switch 12 the ability to make decisions based on end user scripted instructions represented in script file 32. The decisions can take into account network position and topology of switch 12 and network 11, respectively, including by way of example, and not limitation, switch identity, switch location, thermal information, or other information available on the switch. Communication system 10 may facilitate self discovery of DHCP server 26, automatic and control resolution of installation storm, installation and execution of automated instructions based on the location and identity of switch 12, self detection of location, live verification and communication of deployment process, and self communication to remove stations with the result after upgrade (among other features). In various embodiments, communication system 10 can provide an innovative deployment and upgrade functionality for network equipment at scale, not requiring end user intervention and allowing multiple tier network topologies to be deployed automatically. For example, switch 12 may be replaced without end user intervention with merely a physical notification regardless of the type of fabric (e.g., L2, L3) deployed in network 11.

For purposes of illustrating the techniques of communication system 10, it is important to understand the communications in a given system such as the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, at first deployment or replacement, network devices such as switches are connected to other network elements, upgraded, and configured. The configuration typically depends on several factors, including position (e.g., access, edge, gateway, leaf, spine, etc.), location (e.g., subnet, virtual local area network, etc.), and functionalities (e.g., Top-Of-Rack switch, Local Area Network (LAN) switch, Wide Area Network (WAN) switch, Media Access Control (MAC) filtering, Spanning Tree Protocols, Internet Protocol (IP) clustering, etc.) of the switch in the network. In currently existing network environments, each switch is manually connected, configured, and upgraded by the user, such as a system administrator or network administrator. In some network environments, after initial activation, a portion of the configuration may be remotely managed, for example, through a remote management system; however, the initial activation typically requires manual intervention. In massively scalable data centers, with a large number of switches, such manual process can lead to operational inefficiencies.

Some network environments permit automatic download and installation of the operating system on switches. Such automatic download and installation is a limited function whereby the switch does not locate its position in the network, and does not take post-install operations or live status updates allowing remote monitoring while the process is in progress. Moreover, such automatic installation is not customizable (e.g., via custom scripts), and is not generally applicable for massively scalable data centers, with substantially simultaneous automatic installation and upgrade of multiple devices.

Automatic installation and download of operating systems on servers and other virtual machines are also generally known. For example, Oracle SUN servers can boot over a local area network (LAN) or a wide area connection WAN. A programmable Read Only Memory (PROM) downloads the booter from a boot server or an install server located in the network. When booting over a LAN, the firmware uses DHCP to discover either the boot server or the install server. Trivial File Transfer Protocol (TFTP) is used to download the booter. When booting over a WAN, the firmware uses either DHCP or non-volatile Random Access Memory (NVRAM) properties to discover the install server, the router, and the proxies for the system to boot from the network, and downloads the booter using HTTP. In addition, the booter's signature is often checked with a predefined private key. However, such automatic download mechanisms do not apply to switches, where the configuration information depends on the switch location, identity, or other environmental variables, among other features.

Some automatic download and installation procedures with respect to servers use DHCP mechanisms for determining the IP address of the server from which to download boot files. In general, DHCP includes a sequence of messages that can be sent between DHCP clients and servers. The DHCP discover message is broadcast by a DHCP client when the DHCP client first attempts to connect to the network. The DHCP discover message typically requests IP address information from a DHCP server. In response to the DHCP discover message, the DHCP server that has an IP address configuration to offer to the client broadcasts a DHCP offer message to the DHCP client. The DHCP offer message typically contains an available IP address and additional network configuration information, such as the subnet mask and default gateway. More than one DHCP server can respond with a DHCP offer message. The DHCP client accepts (e.g., selects) the best offer, for example, the first DHCP offer message that it receives.

The DHCP client thereafter broadcasts a DHCP request message. The DHCP request message contains the IP address from the DHCP offer that was selected. Thereafter, the DHCP server typically broadcasts a DHCP acknowledgement (DHCP ACK) message to the DHCP client acknowledging the DHCP request message. The DHCP server also forwards any options with the DHCP ACK message. Upon receipt of the DHCP ACK message, the DHCP client can use the IP address to participate in the network and complete its system startup.

Unlike servers, switches typically require complex configuration settings to function appropriately in the network. For example, a Cisco Catalyst 6500 switch may need the following configurations to function appropriately: Router Mode with Multilayer Switch Feature Card (MSFC) on Client Side; Bridged Mode with the MSFC on Client Side; Probe configurations; Source Network Address Translation (NAT) for Server-Originated Connections to virtual IP (VIP) address; Session Persistence (Stickiness) settings; Direct Access to Servers in Router Mode; Server-to-Server Load-Balanced Connections; Route Health Injection; Server Names; Backup Server Farm settings; Load-Balancing Decisions Based on the Source IP Address; Layer 7 Load Balancing; HTTP Redirect; etc. Such configuration settings may vary with the position of the switch in the network and the network topology (among other factors). For example, a switch in a TRILL network may be configured differently from a switch in a ring topology; moreover, a leaf switch in the TRILL network may be differently configured from a spine switch in the same TRILL topology. The automatic download procedures applicable for servers and operating systems of switches typically do not handle such complex configuration scenarios.

Communication system 10 is configured to address these issues (and others) in offering a system and method for deployment and upgrade of network devices in a network environment. In various embodiments, POAP module 14 may automate the process of upgrading software images and installing configuration files on switch 12 that are being deployed in network 11 for the first time. The POAP process can include four phases: (1) power up; (2) DHCP discovery; (3) script execution; and (4) post-installation reload. When switch 12 is powered up for the first time, it loads any software image installed at manufacturing and tries to find a configuration file in bootflash 20 or RAM 22 (or other suitable memory element 18) from which to boot. When switch 12 does not find a startup configuration within itself (e.g., in bootflash 20), switch 12 may enter POAP mode. In some embodiments, user intervention may not be sought for POAP mode to continue. In other embodiments, a pop up window may inquire if the user wants the POAP mode. In POAP mode, DHCP discovery process is initiated. Substantially all network interfaces on switch 12 may be activated in a non-forwarding mode until completion of the DHCP discovery process.

During DHCP discovery process, switch 12 may send out DHCP discover messages (e.g., DHCPDISCOVER messages) on substantially all active interfaces (including the management interface, if any) soliciting DHCP offer messages from any DHCP server(s), including DHCP server 26. The DHCP discover messages may include the switch serial number and MAC address labeled on switch 12. In some embodiments, the switch make and model number (or name), or part number may be additionally (or alternatively) included in the DHCP discover messages. In some embodiments, a DCHP client on switch 12 can use the switch serial number in a client-identifier option to identify itself to DHCP server 26. DHCP server 26 can use the identifier to send DHCP information 30 back to the DHCP client on switch 12.

In various embodiments, the DHCP discover message can also solicit the server address or name of script server 30 and bootfile name (including name of script file 32) from DHCP server 26. DHCP server 26 may relay the server name or server address and the bootfile name in DHCP information 28 to the DHCP client on switch 12. In some embodiments, DHCP information 28 may be included in the DHCP offer message from DHCP server 26. In other embodiments, DHCP information 28 may be included in the DHCP ACK message from DHCP server 26. The DHCP client may use DHCP information 28 to contact script server 30 and obtain script file 32. The bootfile name can include the complete path to the bootfile (which may be included in script file 32 in some embodiments) on script server 30. The DHCP client on switch 12 can use the bootfile name to download script file 32.

In some embodiments, when multiple DHCP offer messages are received (for example, from multiple DHCP servers in network 11), a single DHCP offer message may be randomly chosen. Switch 12 may complete the DHCP negotiation (e.g., including request and acknowledgment) with selected DHCP server 26, and DHCP server 26 may assign an IP address to switch 12. If there is a failure in any of the subsequent steps in the POAP process, the IP address can released back to DHCP server 26. If no DHCP offer messages meet expectations (e.g., as pre-configured in POAP module 14, for example, where the DHCP offer does not include DHCP information 28), switch 12 may not complete the DHCP negotiation and an IP address may not be assigned.

In some embodiments, where multiple switches transmit queries for existence, a master server may orchestrate responses. In the absence of an acknowledgement, a retry with timer may be applied with N tries (e.g., as configured by the user). The DHCP offer messages from multiple DHCP servers may be issued in a staggered manner based on a pre-defined schedule. Unknown (or undiscovered) devices in network 11 may be re-timed to a different pace or placed idle by a specific DHCPOFFER message with a specific option. Co-ordination of activation of multiple switches may be automated through the remote master server in some embodiments. According to various embodiments, switch connectivity (e.g., to other switches and servers) may be inactive until the POAP process has completed. The amount of traffic generated on network 11 for the POAP activities may be under 1% of the switch capacity load in some embodiments.

In some embodiments, the master server may be informed of the switch identity by the switch unique router MAC address and the switch serial number. The master server may provide to DHCP server 26 (for including in DHCP information 28) the IP address of switch 12, the address (e.g., IP address, uniform resource locator (URL) of a hypertext transfer protocol (HTTP) server, etc.) of script server 30, and activate live verification and communication deployment process, followed (in some embodiments) by a post-upgrade process for forwarding on to switch 12. According to various embodiments, switch 12 (and other participating switches) may receive the DHCP offer message (or DHCP ACK message) including various options specifying DHCP information 28. For example, the options may specify the name (or address) of script server 30, the communication method (e.g., TFTP, file transfer protocol (FTP) hypertext transfer protocol (HTTP), etc.) for downloading script file 32, etc.

Switch 12 may contact script server 30 and download script file 32 (e.g., using TFTP or HTTP or other communication protocol as specified in DHCP information 28) and store it locally within memory element 18. Script file 32, when executed by switch 12, may retrieve the switch-specific identifier, for example, the serial number, download software images 38 (e.g., system and kickstart images) and configuration file 36 if they do not already exist on bootflash 20 in switch 12, install software images 38 on switch 12 and store them in RAM 22 for the next reboot, schedule the downloaded configuration file 36 to be applied at the next switch reboot, and store configuration file 36 in RAM 22 as the startup-configuration for the next reboot. As used herein, the term "reboot" includes restarting switch 12, including executing initial processes for startup.

Script file 32 may include automated instructions relevant to location and identity of switch 12. Script file 32 may be pre-configured by the user (e.g., system administrator, network administrator, etc.) before download by switch 12. Pre-configuration can include specifying various relevant information, such as: the filenames and locations of configuration file 36 and software images 38; method of downloading configuration file 36 and software images 38; local storage location and naming conventions on switch 12; configuration process; software upgrade process; and various other POAP process settings.

In some embodiments, script file 32 may include a signature, such as a hash key, for checking file integrity. In other embodiment, DHCP server 26 may provide the hash key. For example, an MD5 checksum can be included in script file 32, or provided by DHCP server 26. The MD5 checksum can be validated to confirm integrity of script file 32. If the MD5 matches, the POAP process may continue. In some embodiments, if the MD5 fails, script file 32 may be downloaded again, and the process repeated, until the MD5 matches. In other embodiments, if the MD5 fails, the POAP process may begin anew with a new DHCP discover message. In some embodiments, switch 12 may inform DHCP server 26 (or a master server, as appropriate) whether verification and/or execution of script file 32 was successful. Such notification may be implemented using any suitable mechanism, including Simple Network Management Protocol (SNMP), SYSLOG, etc. Information pertaining to execution of script file 32 may be stored in bootflash 20 in switch 12.

On successful completion of the validation, or on the failure of the validation, the corresponding result can be stored in an internal non-volatile state (e.g., in memory element 18). Additionally (or alternatively), the result can be relayed to the remote management servers in network 11. In some embodiments, the relaying can be performed while the POAP process on switch 12 is being executed. The result can be further used to trigger a restart of the provisioning if failures or incomplete operations were detected. In some embodiments, the success or failure of the POAP process may be visually displayed on switch 12, for example, with LED lighting up when POAP process is complete.

In some embodiments, on discovery of remote management servers (e.g., master server), switch 12 can forward status information about specific operations to one or more such remote management servers. The status information can be qualified by any unique identifier (e.g., serial number, MAC address, etc.) of switch 12 in network 11. The unique identifier can be further used to filter and/or organize the status information on the remote management servers. In some embodiments, switch 12 may buffer (e.g., aggregate and store locally) the status information and the buffered logs may be delivered to the remote management servers later as appropriate.

In some embodiments, the log files may be stored on bootflash 20, in a predefined format (e.g., YYMMDD_poap_PID_script.log, indicating log file of script execution; YYMMDD_poap_PID_init.log, indicating log file of operations prior to executing script file 32; etc.) Script file 32 may be modified suitably to change the format of the log files. In an example script file 32, the appropriate command line may be modified to poap_script_log="/bootflash/% s_poap_% s_script.log" % (strftime("% Y % m % d % H % M % S", gmtime( )), os.environ['POAP_PID']). It is also possible to write custom messages within the log file (e.g., poap_write_to_file(poap_script_log_handler, "\nINFO: PoAP on Nexus Series Rocks!"). At any time, it is possible to abort the POAP process, complete the basic setup steps and login switch 12 to retrieve the log files stored in bootflash 20. In some embodiments, only a limited number (e.g., 5) log files may be saved in bootflash 20 (e.g., to reduce storage space requirements).

In some embodiments, configuration file 36 may not be applied to switch 12 immediately, for example, where the software image currently running on switch 12 does not support all of the commands in configuration file 36. In such embodiments, the newly downloaded software images 28 may execute after switch 12 reboots. Subsequently, or alternatively substantially simultaneously, configuration file 36 may be applied to software images 38 on switch 12. If switch 12 loses connectivity, execution of script file 32 may stop, and switch 12 may reload software images 38 and bootup variables already present therein. Subsequent to configuring software images 38, switch 12 may copy the executing configuration file 36 to its startup configuration.

In some embodiments, prior to executing script file 32, switch 12 may detect network neighbors, for example, using Cisco Discovery Protocol (CDP) or Link Layer Discovery Protocol (LLDP) or other suitable protocol. Detecting neighbors may include detecting links connected to neighbors, the type of links used by neighbors to connect to switch 12, serial numbers of neighbors, hostnames of neighbors, MAC addresses of neighbors, software versions of neighbors, operating systems of neighbors, etc. The detected information may be stored locally in memory element 18 and can be used by script file 32 during execution.

In some embodiments, after activation and upgrade, switch 12 may initiate communication of state information to the remote management servers. The state information can include configuration, reachability and other aspects of provisioning related to switch 12. Pre-determined actions (or script files) may be downloaded or dynamically pre-built as a part of the script provisioning process for the state information communication. The set of actions (or script files) can be specific to switch 12 or generic to substantially all similar network elements within network 11. In some embodiments, switch 12 may be pre-configured to detect the completion of provisioning (e.g., POAP process). When completion of provisioning is detected, a pre-defined set of actions (or script files) may be generated and/or executed in switch 12. The actions may include validating the specific configuration of switch 12, for example, by comparing it to a reference configuration and validating the reachability of a default gateway (e.g., gateway 24).

POAP module 14 may provide an intelligence mechanism to switch 12 in network 11 to self-configure and upgrade based on its physical location and neighbors, facilitating automated initial network deployment, and smart upgrades, triggered by network management without direct user intervention on switch 12. Embodiments of communication system 10 may enable automation, address scale deployments and upgrades of thousands of network devices in the network, and allow customizable interfaces with HTTP. The upgrade method according to various embodiments can use any ports (e.g., inband or outband, or USB, etc.). The operations described herein are not limited to the type of network fabric (e.g., L2, L3). Embodiments of communication system 10 may be simple to use, relying on industry standard protocols and adapted to different management tools, such as TFTP, FTP, secure FTP (SFTP), HTTP protocols, etc. Alterations to existing activation procedures or switch behavior may not be needed, for example, normal boot up factory process may be used if so desired by the end user.

Turning to the infrastructure of communication system 10, the network topology can include any number of servers, gateways, switches, and other network elements inter-connected to form a large and complex network 11. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, DHCP server 26, script server 30 and configuration and software server 34 may be implemented in a single physical network element, for example, as separate virtual machines, server applications, etc. In other embodiments, one or more of DHCP server 26, script server 30 and configuration and software server 34 may be implemented in separate physical network elements, communicating with each other over physically distinct communication links. Gateway 24 may be a suitable router, or switch, configured to forward data from one network element to another. Bootflash 20 may include a flash memory device used primarily to store boot software image and system configuration information. RAM 22 may include any suitable RAM device, including dynamic RAM (DRAM) and static RAM (SRAM).

In various embodiments, POAP module 14 may be an application installed on switch 12 during manufacturing, or after manufacturing and before activation of switch 12 in network 11. An "application" as used herein this Specification, can be inclusive of an executable file comprising instructions that can be understood and processed on a computer, and may further include library modules loaded during execution, object files, system files, hardware logic, software logic, or any other executable modules. POAP module 12 may include a DHCP client and other functionalities for performing the operations described herein.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the communication system 10 shown in FIG. 1 is simplified for ease of illustration.

Figure 2:
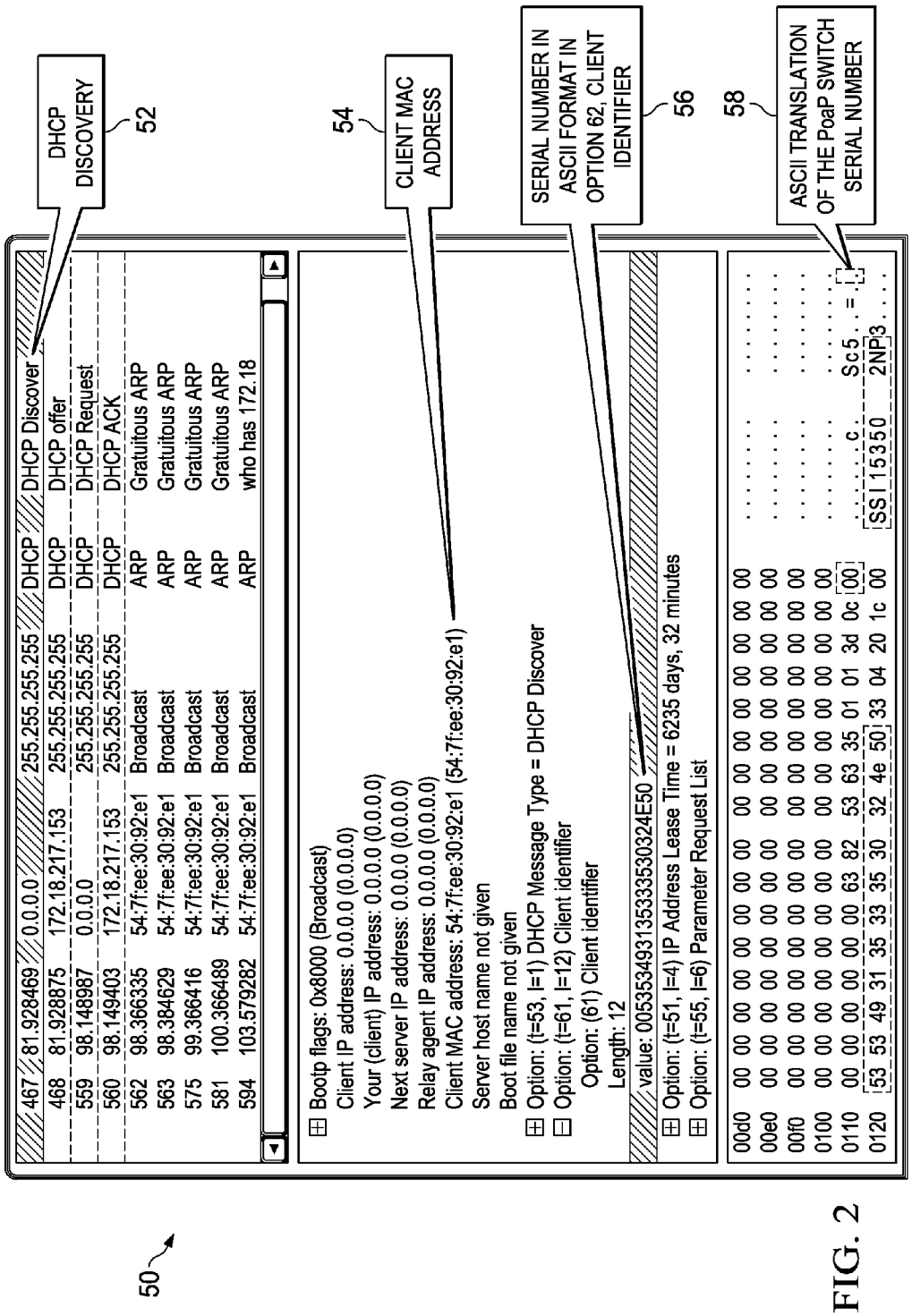
FIG. 2 is a simplified diagram illustrating example details of the system in accordance with one embodiment.

Turning to FIG. 2, FIG. 2 is a simplified diagram illustrating a packet capture 50 on DHCP server 26 during a start-up phase of the POAP process according to an embodiment of communication system 10. Packet capture 50 indicates a DHCP discover message 52, showing a client MAC address 54 (e.g., 54:7f:ee:30:92:e1); a serial number 56 in ASCII format (e.g., 00 53 53 49 31 35 33 35 30 32 4E 50) that can identify switch 12; and an ASCII translation 58 (e.g., SS115350 2NP3) of switch serial number 56. It may be noted that the example values indicated in the FIGURE are merely for illustrative purposes, and are not intended to be limitations of embodiments of communication system 10.

Figure 3:
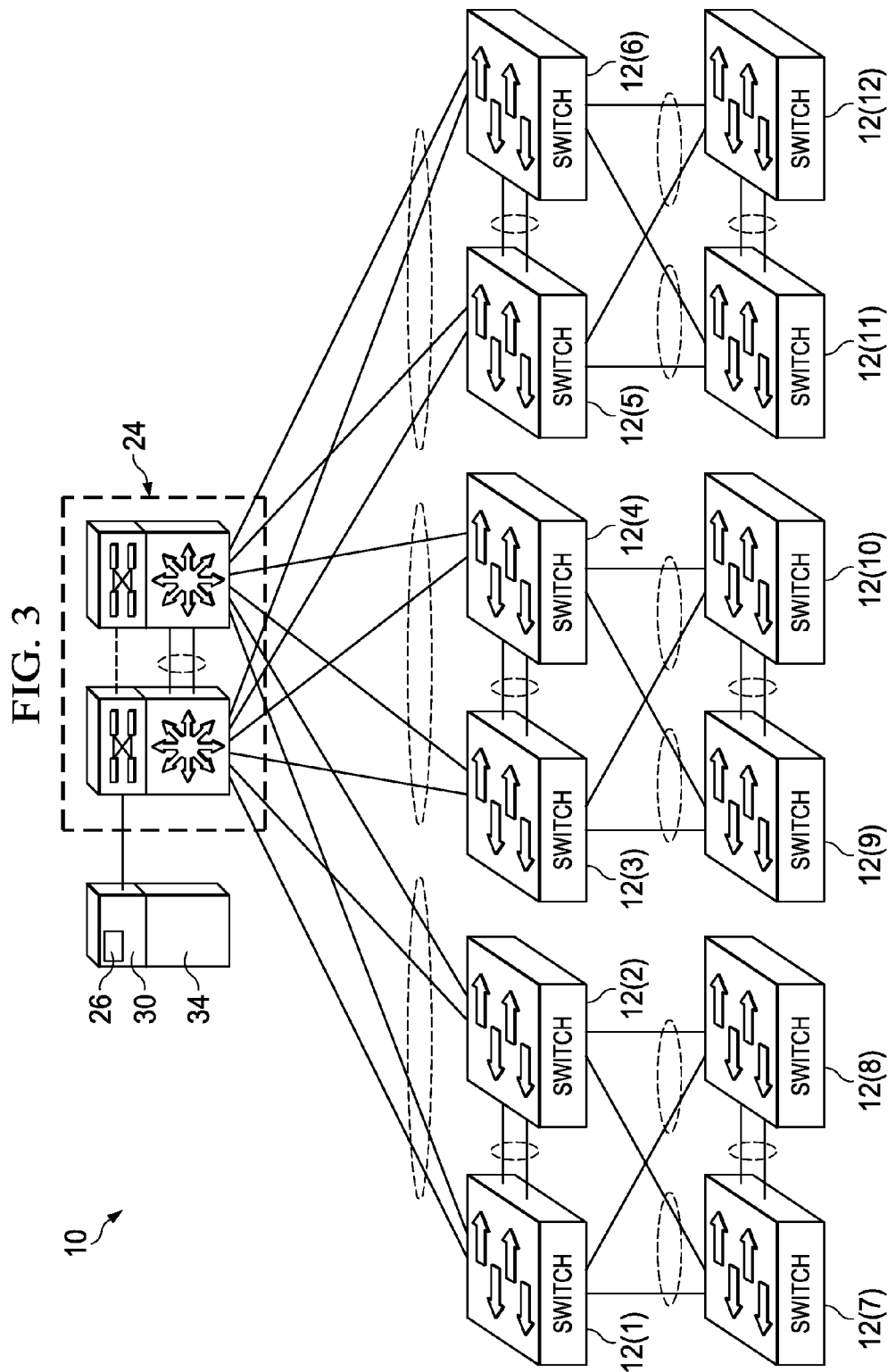
FIG. 3 is a simplified block diagram illustrating further example details of the system in accordance with one embodiment.

Turning to FIG. 3, FIG. 3 is a simplified diagram illustrating an example network topology according to an embodiment of communication system 10. Switches 12(1)-12(6) may be disposed on a first layer of network 11, and switches 12(7)-12(12) may be disposed on a second layer of network 11, such that switches in the second layer may communicate with gateway 24 only through switches in the first layer. In such network topology, switches 12(1)-12(6) in the first layer may self-activate prior to self-activation of switches 12(7)-12(12) in the second layer. Moreover, switches 12(1)-12(6) in the first layer may determine that they are located in the first layer, and that there are other switches 12(7)-12(12) located in the second layer, to which they are connected via link aggregation (virtual Portchannel (vPC), EtherChannel) or other network architecture. It may be noted that although only six switches are illustrated in each of two layers of the network topology, any number of switches and layers may be included in network 11 in any suitable topology (e.g., spine/leaf topology, TRILL networks, etc.) within the broad scope of the embodiments.

DHCP server 26, script server 30 and configuration and software server 34 may be co-located on a single physical server according to some embodiments. Gateway 24 may comprise a pair of switches in vPC configuration with switches 12(1)-12(6) in the first layer. Switches 12(7)-12(12) may comprise Top-Of-Rack switches that are coupled to other servers as appropriate.

According to various embodiments, switches 12(1)-12(6) may initiate the POAP process substantially simultaneously. (Switches 12(7)-12(12) may also initiate the POAP process substantially simultaneously with switches 12(1)-12(6); however, because switches 12(1)-12(6) may not be fully operational during the POAP process, network connectivity of switches 12(7)-12(12) with gateway 24 may not be established, and consequently, the POAP process may fail until switches 12(1)-12(6) are operational). Each of switches 12(1)-12(6) may substantially simultaneously broadcast DHCP discover messages, and DHCP server 26 may respond to each switch 12(1)-12(6) with separate DHCP information 28, as appropriate. Each of switches 12(1)-12(6) may substantially simultaneously download respective script file 32 from script server 30, and execute respective script file 32 locally. Separate (and distinct) configuration files 36 and software images 38 may be downloaded from configuration and software server 34 as appropriate substantially simultaneously by switches 12(1)-12(6). Other operations as described herein may also be executed substantially simultaneously by switches 12(1)-12(6).

Subsequent to self-configuration of switches 12(1)-12(6), switches 12(7)-12(12) in the second layer may initiate the POAP process substantially simultaneously. In some embodiments, switches 12(7)-12(12) may detect that neighbor switches 12(1)-12(6) are operational and that network connectivity to gateway 24 can be established. In other embodiments, after switches 12(1)-12(6) are operational, they may forward DHCP discover messages broadcast by switches 12(7)-12(12) to DHCP server 26. In yet other embodiments, a remote management server may power up switches 12(7)-12(12) after receiving status notification from switches 12(1)-12(6) that they have completed activation. Various other scenarios for initiating the POAP process by switches 12(7)-12(12) may be included within the broad scope of the embodiments.

Turning to FIG. 4, FIG. 4 is a simplified diagram illustrating an example DHCP configuration file 60 according to an example embodiment of communication system 10. Information included in DHCP configuration file 60 may be included in DHCP information 28, for example, according to DHCP standards. DHCP server 26 may be pre-configured with DHCP configuration file 60 in some embodiments. Various options may be included in DHCP configuration file 60 for downloading script file 32. For example, DHCP configuration file 60 may indicate that script file 32 can be downloaded via TFTP from script server 30 located at 10.10.1.50 in the network. The name of script file 32 to be downloaded may be poap_script.py as specified in example configuration file 60. Note that the example script name is not intended to be a limitation of embodiments of communication system 10. Any filename and location may be used within the broad scope of the embodiments.

Turning to FIG. 5, FIG. 5 is a simplified diagram illustrating example details of an MD5 checksum verification mechanism according to an embodiment of communication system 10. The POAP process can match the script file MD5 against its definition 62 in script file 32. Example definition 62 specifies that the MD5 value should be "d1fd3449f5285d90070bfd04d98e9bd1." In some embodiments, to find the MD5 size of script file 32, an example Linux command "md5sum" can be used (with the user editing script file 32 to add the md5sum of script file 32) as indicated by commands 63.

To bypass the MD5 checksum verification, #md5sum line from script file 32 may be simply removed. In some embodiments, the POAP process may remove the MD5 sum line from script file 32 before calculating the MD5 sum of script file 32, for example, to ensure compliance between the value entered in script file 32, and the script file md5 value before adding the comment.

Turning to FIG. 6, FIG. 6 is a simplified diagram illustrating an example set 64 of configuration settings associated with configuration and software server 34. Example set 64 may be included in script file 32, for example, in a section called "host name and user credentials." The "hostname" variable in example set 64 may specify the IP address (e.g., 192.168.1.1) of configuration and software server 34 with login credentials of user (username) and cisco (password). In other embodiments, configuration and software server 34 may be specified by any unique identifier, for example, a device name, serial number, etc., using which switch 12 can communicate with configuration and software server 34.

Turning to FIG. 7, FIG. 7 is a simplified diagram illustrating an example code 66 for selecting configuration file 36 from configuration and software server 34. The configuration activities in the POAP process can include identifying appropriate configuration file 36 for download by switch 12 and the download process of configuration file 36 from configuration and software server 34 via a suitable method (e.g., FTP or Secure Copy Program (SCP)). In various embodiments, configuration file 36 may be applied after the software upgrade process completes, for example, after the reload has been performed.

The logic to determine appropriate configuration file 36 for download may be specified in script file 32, for example, by setting an appropriate variable (e.g., "poap_config_file_mode") according to example code 66. According to one example embodiment, a given configuration file name may be provided in script file 32, and switch 12 may download configuration file 36 according to the specified filename syntax. According to another example embodiment, switch 12 can utilize the neighbor information of the interface after the DHCP offer message is received from DHCP server 26. The CDP neighbor information can include the interface number, the serial number, hostname or upstream interface number of configuration and software server 34. According to yet another example embodiment, switch 12 may use its router MAC address (which may be unique per switch) to download configuration file 36 that includes the MAC address as a switch serial number. In some embodiments, the serial number mechanism may be set to be the default mechanism for determining configuration file 36.

In an example embodiment, the option to choose configuration file 36 according to the switch serial number may be specified in the configuration file name, for example, as conf_SERIALNUMBER.cfg. For example, conf_SSI1453ATSM.cfg may be a file located on configuration and software server 34 in the directory provided by script file 32. The file may contain the output of a show run for switch 12. Only switch 12 that has the serial number SSI1453ATSM can download configuration file 36 named conf_SSI1453ATSM.cfg. In various embodiments, the filename syntax can be changed in script file 32.

If substantially all switches 12 in network 11 are to use the same filename for configuration file 36, or if there is a logic in DHCP server 26 to provide different script files 32 to the different switches in network 11 (e.g., based of serial number or router MAC address), then a static filename can be used to determine appropriate configuration file 36.

Turning to FIG. 8, FIG. 8 is a simplified diagram illustrating another example code 68 that can be used to determine configuration file 36 according to neighbor information detected by switch 12. In example code 68, the "/" in the intfName variable may be changed to "_" based on the neighbor information. For example, if the DHCP offer message was received on interface Ethernet 1/10, the interface name eth1/10 may be changed to eth1_10, and the filename switch 12 may use to attempt to download may be 'conf_eth1_10.cfg.' In most operating systems, it is generally not possible to create a file with "/" in the filename; therefore, the filename may be based on the interface name in some embodiments.

Turning to FIG. 9, FIG. 9 is a simplified diagram illustrating an example software image definition 70 according to an embodiment of communication system 10. The software upgrade activities in the POAP process may be defined in script file 32 in a specific section, for example, called "System and Kickstart image info" in example software image definition 70 or by any other suitable name. The directory path in configuration and software server 34 may be specified in the section with a suitable variable (e.g., 'image_path'). In some embodiments, depending on the operating system of switch 12, files that activate and execute the software system of switch 12 may include more than one definition. For example, such files may be specified by the source filename (e.g., filename on configuration and software server 34 pointing to the kickstart of system binary files), and the destination filename (e.g., filename structure used to save the kickstart and system image files on bootflash 20 in switch 12). In an example embodiment, the source and destination filenames can be identical. In another example embodiment, the source and destination filenames can be different and configurable, based on user convenience.

According to some embodiment, the user can define timeout values for the download operation from configuration and software server 34. In some embodiments, by default, if software images 38 exist on bootflash 20, they are not downloaded again. In other embodiments, the download operation can be performed irrespective of existence of any software images 38 on bootflash 20 by overwriting the files, for example, by changing a value (e.g., 0 to 1) of one or more specific variables (e.g., "_image_copied"). In example software image definition 70, the variables that can be modified by the user in script file 32 include: image_path, system_image_src, system_image_dst, system_image_copied, kickstart_image_src, kickstart_image_dst, kickstart_image_copied, config_timeout, system_timeout, kickstart_timeout. Note that the variable names are provided herein merely for example purposes, and are not intended to be limitations of embodiments of communication system 10. Any suitable name and number of variables may be defined in script file 32 according to the broad scope of the embodiments.

Turning to FIG. 10, FIG. 10 is a simplified diagram illustrating an example algorithm 72 for copying configuration file 36 and software images 38 according to an embodiment of communication system 10. In an example embodiment, POAP module 14 may check for available free space (e.g., 150 MB) in bootflash 20 of switch 12, prior to attempting to download configuration file 36 and software images 38. The amount of available free space may be changed by the user by modifying script file 32 appropriately. Example algorithm 72 may be implemented in script file 32 and changed by the user, if needed, according to particular configurations. In example algorithm 72, a log file may be generated to indicate the status of the copy and install process.

Turning to FIG. 11, FIG. 11 is a simplified diagram illustrating another example algorithm 74 for copying configuration file 36 and software images 38 according to an embodiment of communication system 10. Configuration file 36 and software images 38 may be located in a library and may be transferred using FTP (or other suitable protocol). Global login information (e.g., username and password) may be provided in script file 32. Example algorithm 74 may fail if the destination files do not exist on configuration and software server 34, or are not downloadable (e.g., due to insufficient access permissions or other reasons).

Turning to FIG. 12, FIG. 12 is a simplified diagram illustrating an example algorithm 76 for splitting configuration file 36 according to an embodiment of communication system 10. In various embodiments, configuration file 36 may be split into two parts, with a first part comprising configuration settings (e.g., port-profile changes) that are activated upon a reboot of switch 12; and a second part comprising configuration settings that may not require a reboot of switch 12.

Turning to FIG. 13, FIG. 13 is a simplified diagram illustrating an example console message 78 according to an embodiment of communication system 10. After configuration file 36 and software images 38 have been downloaded, switch 12 may be reloaded with downloaded software images 38 and configurations from configuration file 36 may be applied. Example console message 78 may notify of the status of the POAP configuration process, by displaying "applying scheduled configuration" when the configuration settings are being applied. A copy of the running-configuration to the startup-configuration in RAM 22 may follow and the message "copy complete" may be displayed. Compliance between existing operating system and other software on switch 12 and the running configuration applied from downloaded configuration file 36 may be achieved, as new features or different configuration methods can be used related to the version of downloaded software images 38. After the POAP configuration process has completed, a message "done" may be displayed, and further prompts for user login may be provided, if needed. Any suitable message (including message type and format) may be displayed appropriately according to the broad scope of the embodiments of communication system 10.

Figure 14:
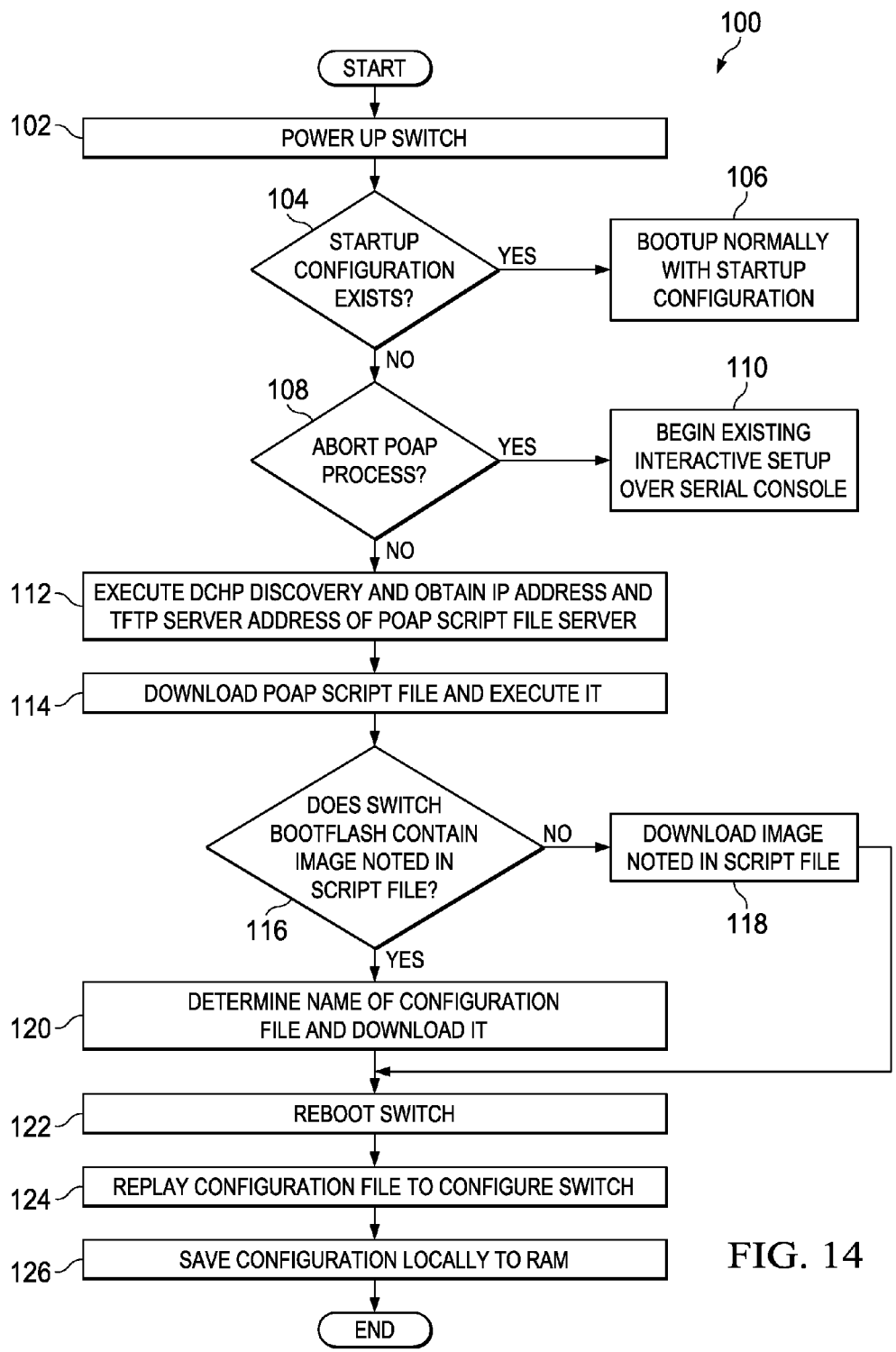
FIG. 14 is a simplified flow diagram illustrating example operations that may be associated with an embodiment of the system.

Turning to FIG. 14, FIG. 14 is a simplified flow diagram illustrating example operations 100 that may be associated with POAP module 14 according to an embodiment of communication system 10. At 102, switch 12 may be powered up. At 104, switch 12 may make a determination whether the startup configuration exists on bootflash 20. If the startup configuration exists on bootflash 20, at 106, switch 12 may bootup normally (without using the POAP process) with the startup configuration. If the startup configuration does not exist on bootflash 20 at 104, a determination may be made at 108 whether the POAP process may be aborted. If the POAP process is to be aborted, an interactive setup over serial console may be started at 110. Such a process may require direct user intervention. If the POAP process is not to be aborted at 108, at 112, DHCP discovery may be executed, for example, by broadcasting DHCP discover messages, receiving DHCP offer messages; sending DHCP request messages and receiving DHCP ACK messages. In an example embodiment, switch 12 may obtain the IP address and TFTP (or HTTP, or SFTP, or FTP, etc.) address of script server 30 (also referred to as POAP script file server).

At 114, script file 32 may be downloaded by POAP module 14 and executed. At 116, a determination may be made whether bootflash 20 in switch 12 contains image(s) noted in script file 32. If bootflash 20 does not contain image(s) noted in script file 32, software images 38 noted in script file 32 may be downloaded from configuration and software server 34 at 118. If bootflash contains image(s) noted in script file 32, the name of configuration file 36 may be determined and configuration file 36 may be downloaded from configuration and software server 34 at 120. At 122, switch 12 may be rebooted (automatically, without user intervention). At 124, configuration file 36 may be replayed (e.g., applied to software images 38) to configure switch 12. At 126, the configurations (e.g., in configuration file 36 may be saved locally to RAM 22 in switch 12.

Figures 15, 16:
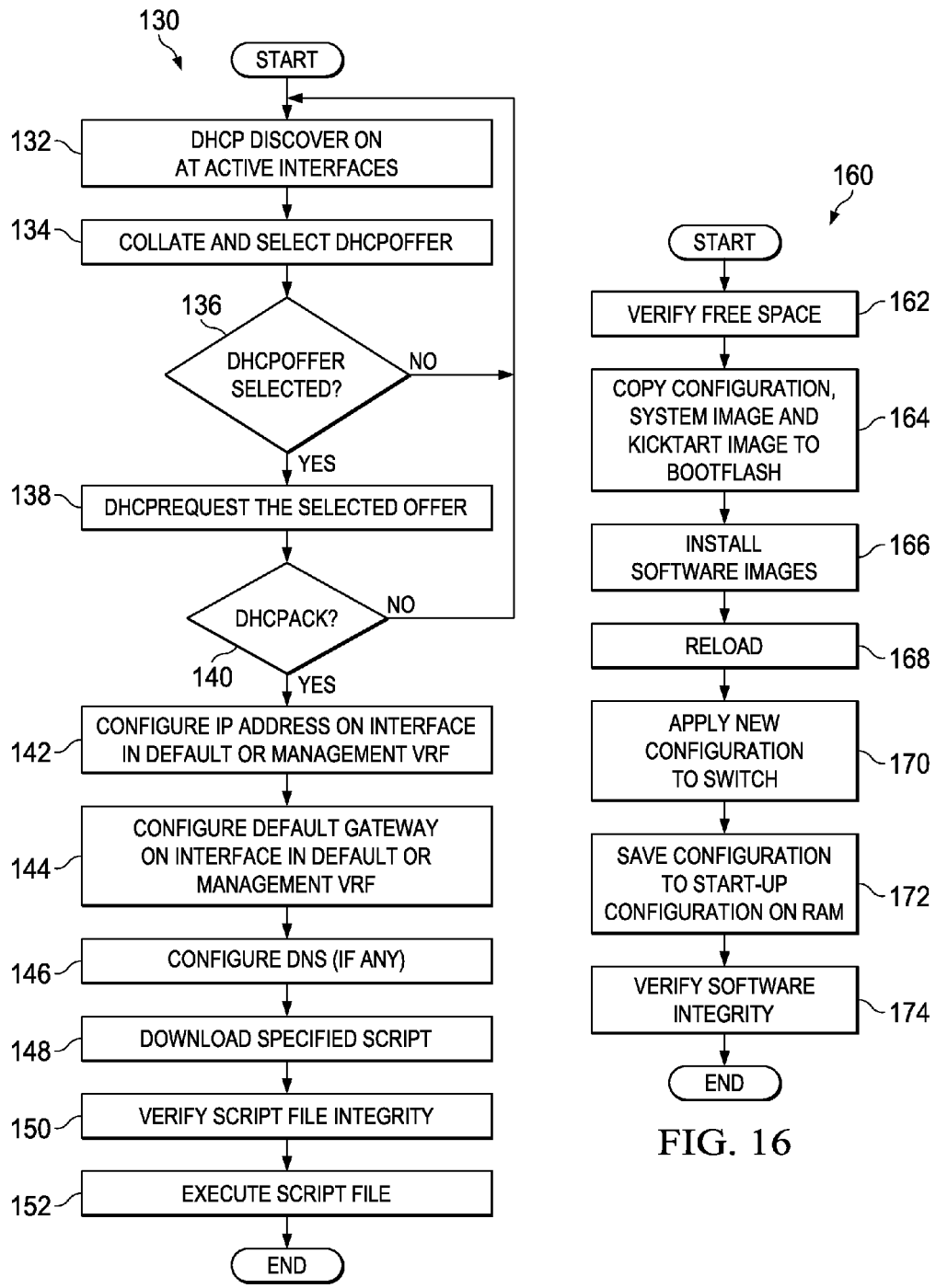
FIG. 15 is a simplified flow diagram illustrating further example operations that may be associated with an embodiment of the system.
FIG. 16 is a simplified flow diagram illustrating further example operations that may be associated with an embodiment of the system.

Turning to FIG. 15, FIG. 15 is a simplified diagram illustrating example operations 130 associated with DHCP discovery according to an embodiment of communication system 10. At 132, DHCP discovery may be turned on at active interfaces of switch 12, and appropriate DHCP discover messages may be broadcast therefrom. At 134, one or more DHCP offer messages may be received, collated and a specific DHCP offer message may be selected. At 136, a determination may be made whether a DHCP offer message has been selected. If not, the operations may step back to 132, and DHCP discovery messages may be broadcast yet again. If a DHCP offer message has been selected, at 138 a DHCP request message corresponding to the selected DHCP offer message may be broadcast. At 140, a determination may be made whether a DHCP ACK message has been received. If not, the operations may step back to 132, and DHCP discover messages may be broadcast yet again.

If a DHCP ACK message has been received, at 142, the IP address of switch 12 received from DHCP server 26 may be configured on the interfaces (for example, in default or management virtual routing and forwarding (VRF). At 144, the default gateway (e.g., gateway 24) may be configured on the interfaces (e.g., in default or management VRF). At 146, domain name system (DNS), if any, may be configured with the IP address. At 148, script file 132 specified in the DHCP offer message may be downloaded from the specified script server 30. At 150, the script file integrity may be verified. At 152, the script file may be executed.

Turning to FIG. 16, FIG. 16 is a simplified diagram illustrating example operations 160 that may be associated with the POAP process according to an embodiment of communication system 10. At 162, POAP module 14 may verify available free space in switch 12 against space requirements configured in script file 32. At 164, configuration file 36, and software images 38 (including kickstart image and system image) may be copied to bootflash 20. At 166, software images 38 may be installed in switch 12. At 168, switch 12 may be rebooted, and software images 38 may be reloaded. At 170, new configuration settings from configuration file 36 may be applied to software images 38. At 172, configuration file 36 may be saved as the startup configuration on RAM 22. At 174, the software integrity may be verified.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, POAP module 14. In some embodiments, one or more of these features may be implemented in hardware, provided external to these elements, or consolidated in any appropriate manner to achieve the intended functionality. The various network elements (e.g., switch 12, DHCP server 26, script server 30, configuration and software server 34, etc.) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 12, DHCP server 26, script server 30, configuration and software server 34 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements (e.g., memory element 18) can store data used for the operations described herein. This includes the memory element being able to store instructions (e.g., software, logic, code, etc.) in non-transitory tangible media, such that the instructions are executed to carry out the activities described in this Specification. A processor can execute any type of instructions associated with the data to achieve the operations detailed herein in this Specification. In one example, processors (e.g., processor 16) could transform an element or an article (e.g., data) from one state or thing to another state or thing. In another example, the activities outlined herein may be implemented with fixed logic or programmable logic (e.g., software/ computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 18) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   initiating, by a switch in a network, a Dynamic Host Configuration Protocol (DHCP) discovery process upon powering up;
   discovering a DHCP server in the network;
   receiving DHCP information comprising a filename and location of a script file from the DHCP server, wherein the script file includes automated instructions including a location of a remote configuration and software server in the network hosting a configuration file and software images relevant to the switch, filenames of the configuration file and software images, method of downloading the configuration file and software images from the remote configuration and software server, local storage location and naming conventions on the switch, and a hash key for checking script file integrity;
   downloading the script file from a remote script server in the network; and
   executing the script file on the switch, wherein the executing includes:
      copying the configuration file and one or more software images from the remote configuration and software server to a memory element of the switch, wherein the configuration file includes configuration settings relevant to at least a switch identity, and a switch location in the network;
      installing the software images on the switch;
      rebooting the switch;
      applying configuration settings from the configuration file to the software images; and
      saving the configuration file.

2. The method of claim 1, further comprising discovering neighbors of the switch in the network environment.

3. The method of claim 1, further comprising generating a log file indicative of a status of activation of the switch.

4. The method of claim 1, wherein the DHCP information is received in a DHCP offer message in response to a DHCP discover message broadcast by the switch at an interface activated in a non-forwarding mode.

5. The method of claim 1, wherein the script file is configurable to specify a method of copying the configuration file and the one or more software images.

6. The method of claim 1, wherein the configuration file can be specified in the script file according to at least one of a static filename, a location of a network element hosting the configuration file, and a serial number associated with the switch.

7. The method of claim 6, wherein the serial number corresponds to a unique identifier of the switch, and wherein the filename of the configuration file includes the serial number.

8. The method of claim 1, wherein the configuration file can be specified in the script file to be split into a first part and a second part, wherein the first part includes configuration settings that are activated upon a reboot of the switch.

9. The method of claim 1, wherein the script file is downloaded by at least one protocol from a group consisting of file transfer protocol (FTP), secure file transfer protocol (SFTP), trivial file transfer protocol (TFTP), and hyper text transfer protocol (HTTP).

10. The method of claim 1, further comprising verifying integrity of the script file using an MD5 sum of the script file.

11. One or more non-transitory tangible media that includes instructions for execution, which when executed by a processor, is operable to perform operations comprising:
    initiating, by a switch in a network, a DHCP discovery process upon powering up;
    discovering a DHCP server in the network;
    receiving DHCP information comprising a filename and location of a script file from the DHCP server, wherein the script file includes automated instructions including a location of a remote configuration and software server in the network hosting a configuration file and software images relevant to the switch, filenames of the configuration file and software images, method of downloading the configuration file and software images from the remote configuration and software server, local storage location and naming conventions on the switch, and a hash key for checking script file integrity;

downloading the script file from a remote script server in the network; and executing the script file on the switch, wherein the executing includes:
  copying the configuration file and one or more software images from the remote configuration and software server to a memory element of the switch, wherein the configuration file includes configuration settings relevant to at least a switch identity, and a switch location in the network;
  installing the software images on the switch;
  rebooting the switch;
  applying configuration settings from the configuration file to the software images; and
  saving the configuration file.

12. The media of claim 11, wherein the DHCP information is received in a DHCP offer message in response to a DHCP discover message broadcast by the switch at an interface activated in a non-forwarding mode.

13. The media of claim 11, wherein the script file is configurable to specify a method of copying the configuration file and the one or more software images.

14. The media of claim 11, wherein the configuration file can be specified in the script file according to at least one of a static filename, a location of a network element hosting the configuration file, and a serial number associated with the switch.

15. The media of claim 11, further comprising generating a log file indicative of a status of activation of the switch.

16. An apparatus, comprising:
a memory element for storing data; and
a processor operable to execute instructions associated with the data, wherein the processor and the memory element cooperate, such that the apparatus is configured for:
  initiating, by the apparatus, a DHCP discovery process upon powering up;
  discovering a DHCP server in the network;
  receiving DHCP information comprising a filename and location of a script file from the DHCP server, wherein the script file includes automated instructions including a location of a remote configuration and software server in the network hosting a configuration file and software images relevant to the switch, filenames of the configuration file and software images, method of downloading the configuration file and software images from the remote configuration and software server, local storage location and naming conventions on the switch, and a hash key for checking script file integrity;
  downloading the script file from a remote script server in the network; and
  executing the script file on the apparatus, wherein the executing includes:
    copying the configuration file and one or more software images from the remote configuration and software server to the memory element, wherein the configuration file includes configuration settings relevant to at least a switch identity, and a switch location in the network;
    installing the software images on the apparatus;
    rebooting the apparatus;
    applying configuration settings from the configuration file to the software images; and
    saving the configuration file to the RAM in the memory element.

17. The apparatus of claim 16, wherein the DHCP information is received in a DHCP offer message in response to a DHCP discover message broadcast by the apparatus at an interface activated in a non-forwarding mode.

18. The apparatus of claim 16, wherein the script file is configurable to specify a method of copying the configuration file and the one or more software images.

19. The apparatus of claim 16, wherein the configuration file can be specified in the script file according to at least one of a static filename, a location of a network element hosting the configuration file, and a serial number associated with the apparatus.

20. The apparatus of claim 16, further comprising generating a log file indicative of a status of activation of the apparatus.

* * * * *